US007583229B2

(12) United States Patent
Apostolos et al.

(10) Patent No.: US 7,583,229 B2
(45) Date of Patent: Sep. 1, 2009

(54) METHOD FOR DETECTION OF FAULTY ANTENNA ARRAY ELEMENTS

(75) Inventors: John T. Apostolos, Lyndeborough, NH (US); Richard C. Ball, Loudon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 444 days.

(21) Appl. No.: 11/659,772

(22) PCT Filed: Feb. 24, 2006

(86) PCT No.: PCT/US2006/006784

§ 371 (c)(1), (2), (4) Date: Feb. 8, 2007

(87) PCT Pub. No.: WO2006/091917

PCT Pub. Date: Aug. 31, 2006

(65) Prior Publication Data

US 2008/0094294 A1 Apr. 24, 2008

Related U.S. Application Data

(60) Provisional application No. 60/655,784, filed on Feb. 24, 2005.

(51) Int. Cl.
*H01Q 3/00* (2006.01)
*G01S 7/40* (2006.01)

(52) U.S. Cl. ........................ 343/703; 342/174; 342/368

(58) Field of Classification Search ................ 343/703, 343/853; 342/170–174, 195, 368, 372, 165
See application file for complete search history.

(56) References Cited

U.S. PATENT DOCUMENTS

| | | | | |
|---|---|---|---|---|
| 3,961,260 A | | 6/1976 | Colligan | |
| 4,359,740 A | * | 11/1982 | Frazita | 343/703 |
| 4,434,397 A | | 2/1984 | Nelson | |
| 4,517,570 A | * | 5/1985 | Gray, Jr. | 342/372 |
| 4,639,732 A | * | 1/1987 | Acoraci et al. | 342/371 |
| 4,697,141 A | * | 9/1987 | Feldman | 324/767 |
| 4,799,063 A | | 1/1989 | Hill | |
| 5,185,568 A | | 2/1993 | Mothersbaugh et al. | |
| 5,949,380 A | | 9/1999 | Swank, II | |
| 6,163,296 A | | 12/2000 | Lier et al. | |
| 6,326,929 B1 | | 12/2001 | Berranger | |
| 6,437,577 B1 | | 8/2002 | Fritzmann et al. | |
| 6,603,810 B1 | | 8/2003 | Bednekoff et al. | |
| 6,704,352 B1 | | 3/2004 | Johnson | |
| 6,741,640 B1 | | 5/2004 | Johnson | |
| 2004/0152431 A1 | | 8/2004 | Johnson | |

* cited by examiner

*Primary Examiner*—Michael C Wimer
(74) *Attorney, Agent, or Firm*—Daniel J. Long; Robert K. Tendler

(57) ABSTRACT

A method for early detection of faulty antenna arrays comprising the step of treating said detection as a special case of target recognition; wherein targets of interest are all previous examples of defective antenna arrays.

20 Claims, 11 Drawing Sheets

$$T_{ANT1}(\omega) = \frac{(S_{11}^{C1})_{ANT1}}{(S_{11}^{GS})_{ANT1}}$$

$$T_{ANT2}(\omega) = \frac{(S_{11}^{C1})_{ANT2}}{(S_{11}^{GS})_{ANT2}}$$

$$T_{ANT3}(\omega) = \frac{(S_{11}^{C1})_{ANT3}}{(S_{11}^{GS})_{ANT3}}$$

Create a Template

*Fig. 7*

Create 2-D Vector Template

Create N $T_{2\text{-}D}^{CN}$ Templates to Characterize Every Contingency

Antenna Under Test (Create a 2-D Vector $\Xi$ $\overline{\text{Test}}$)

Measure $(S_{11}{}^{A})_{ANT1}$ $(S_{11}{}^{A})_{ANT2}$ $(S_{11}{}^{A})_{ANT3}$

A = Antenna Under Test $$\overline{\text{Test}}_{ANT1}A = \frac{(S_{11}{}^{C1})_{ANT1}}{(S_{11}{}^{GS})_{ANT1}}$$

$$\overline{\text{Test}}_{ANT2}A = \frac{(S_{11}{}^{C1})_{ANT2}}{(S_{11}{}^{GS})_{ANT2}}$$

$$\overline{\text{Test}}_{ANT3}A = \frac{(S_{11}{}^{C1})_{ANT3}}{(S_{11}{}^{GS})_{ANT3}}$$

Calculate Correlation Coefficient for all N Contingencies $$CC = \frac{T_{2\text{-}D}^{CN} \bullet (2\text{-}D\ \overline{\text{Test}}\ A)^*}{\left| T_{2\text{-}D}^{CN} \right| \times \left| (2\text{-}D\ \overline{\text{Test}}\ A)^* \right|}$$

METHOD FOR DETECTION OF FAULTY ANTENNA ARRAY ELEMENTS

RELATED APPLICATIONS

This application claims rights under 35 USC § 119(e) from U.S. Application Ser. No. 60/665,784 filed Feb. 24, 2005, entitled Method For Detection of Faulty Antenna Array Elements, the contents of which are incorporated herein by reference.

STATEMENT OF GOVERNMENT INTEREST

The present invention was made with United States Government support under Contract No. N00019-02-C-3002 awarded by the US Air Force and Navy. The United States Government has certain rights in this invention.

FIELD OF THE INVENTION

This invention relates to detection of faulty antenna array elements and more particularly to a method for determining faulty unterminated elements in the antenna array.

BACKGROUND OF THE INVENTION

Antenna arrays having multiple elements have been used extensively in direction-finding in which the direction of the major lobe of the array, as well as the side lobe configuration, is determined by a number of active and passive elements in the array. When these arrays are deployed, for instance, on aircraft, the array assembly is first manufactured and then located in a housing commensurate with the application. For instance, in aircraft configurations, the antenna array is housed in pods or in Fiberglas housings, which are then deployed on the aircraft.

The problem in manufacturing such multi-element arrays is the testing of the arrays prior to encapsulation or mounting on the vehicle, vessel or aircraft. The major problem in the manufacture of such arrays is improper termination of the passive elements of the array, usually involving poor termination soldering.

As to the active elements of the array, their proper operation can be tested by cabling the active elements to a back plane where the standing wave ratio of the active elements can be ascertained in a conventional manner. Moreover, proper operation of such an array can be ascertained in the far field by mounting the antenna array at the center of a rather large antenna range and detecting the radiation pattern. This is effective to ascertain if the radiation pattern matches the desired radiation pattern, but in no way indicates what element or elements are faulty in the array. Moreover, transporting an antenna to a facility is uneconomical at best and impractical in most instances because, for instance, if antenna arrays are to be mass-produced at 10 per day, it would be impractical to transport the antenna arrays to an antenna range that may be some miles from the manufacturing facility.

The major defects of such arrays are in the passive elements, which are terminated in most cases by a 50-ohm resistor at the input to the passive element. In a large number of cases, the passive elements could be Vivaldi notch antennas, dipoles, monopoles or V antennas; or in fact any convenient antenna configuration. In general, microwave antennas are terminated with chip-type surface mount resistors that are soldered onto the antenna adjacent the feedpoint.

Oftentimes it is not possible to ascertain whether the termination is effective by visual inspection means. Thus some type of testing must be employed to ascertain if the antenna that has been manufactured meets the specifications. For instance, if one or more of the passive elements of the antenna array are improperly terminated or are unterminated, then the resulting antenna pattern is seriously distorted, making it unusable in direction-finding applications.

In the past, such antennas were checked in a quality control environment utilizing terminated dummy antennas, which are very complex to build. Cables were run to the dummy antennas and terminated with 50 ohms at a back plane, involving excessive cost and potential damage to the antenna when the cables were moved.

In later years the complicated cabling process was discarded in favor of terminations placed at the antenna feedpoint after testing. Instead of the cables coming back and being terminated with 50 ohms, the passive antenna element was terminated right at the feedpoint.

Thus, rather than building antennas that had both active and passive elements, with all elements having cables running back through cables to 50-ohm terminations, presently these antennas are fabricated with the 50-ohm termination at the particular passive antenna element.

This method of fabricating antenna arrays is not easily checked after manufacture other than by transporting the finished antenna array to the antenna range, of which there are very few in existence.

In summary, because there are passive elements in the array in which there are no cables involved, there is a problem in providing an efficient testing system for the directional antennas, especially in high-volume production applications.

The task is to obtain the antenna arrays coming off the production line and to rapidly test them before they go onto the next step, which involves embedding the array into a structure to be mounted for a particular application. The task is to make sure that the antenna array is working properly before other production processes take place, such as, for instance, delivery for integration into whatever platform they are to be used in. If one were to be able to test the array and find out if there is a problem, the problem could be repaired prior to integration. However, if one waited until after integration, if the antenna array proved defective it could not be readily repaired.

These antenna arrays in general for direction-finding purposes include tapered blades, standard dipoles or broadband monopoles or dipoles, and it is an urgent matter to be able to test them bare. Once they get wrapped in Fiberglas for anti-ice protection and the like, they cannot be readily fixed.

In summary, prior antenna array testing techniques were at best cumbersome and highly expensive; and more importantly could not identify what antenna element was defective, meaning unterminated or improperly terminated. All that could be done, even in the antenna range case, would be to ascertain that the antenna pattern was not that which was specified.

SUMMARY OF INVENTION

The subject method or system provides a convenient way to test an assembled antenna array right on the production floor. Not only can the existence of a defective antenna array be ascertained immediately, but also what elements in the array are unterminated and therefore causing a distorted antenna pattern. The method in general includes testing the antenna array by irradiating it with pulses from one or more transmit/receive antennas and measuring the absorption of the impinging energy by the terminated antenna elements. If the elements are properly terminated, then the passive element absorbs energy, which results in reduced energy reflected back to the transmit/receive antennas. What the system is testing is the degree to which a passive element is absorbing energy.

To do this, in one embodiment, the returned signals are passed through a frequency domain reflectometer and the output of the reflectometer for the antenna under test is cross-correlated with a large number of so-called contingency templates. These templates are generated from the measured results from altering an ideal gold standard array by purposely unterminating various elements. Thus, the contingency templates are generated using a gold standard or perfect antenna and purposely unterminating various of the passive elements of the gold standard array. This provides a large number of contingency templates one-to-one correlatable with the passive element or elements that are unterminated.

During testing of the antenna array, cross-correlating a vector corresponding to the reflection coefficient of the antenna array under test with all of the contingency vector templates results in a correlation coefficient that is used to identify the matching contingency and thus the defective array element.

In one embodiment, this is done on the plant floor by locating a number of transmit/receive antennas spaced, for instance, two feet apart and directed towards the antenna array under test, which in one embodiment is eight feet from these transmit/receive antennas. The transmit/receive antennas are driven in sequence by a transmitter, with the results multiplexed to a frequency domain reflectometer that is used because its reflection coefficient output reflects both the phase and amplitude of the reflected signals.

While a time domain reflectometer could be utilized, it would be difficult to analyze the returned pulse envelopes to ascertain which of the passive elements in the array was unterminated. The frequency domain reflectometer is used to provide more information than would be available from a time domain reflectometer.

At the test station, the antenna array under test is placed in an anechoic chamber to minimize reflections from artifacts within the chamber or from the chamber walls themselves. Since the test signals projected by the transmit/receive antennas have a pulse repetition rate, time gating is utilized to eliminate returns from the irradiated antenna array that are the result of multi-path, thereby to eliminate corruption of the reflection coefficient signals from the frequency domain reflectometer.

While in one embodiment only a single transmit/receive antennas is effective, in a preferred embodiment as many as three transmit/receive antennas are utilized that irradiate the antenna array from slightly different angles. The use of slightly different angles permits even more information to be collected as to the returned signals so as to more effectively isolate which of the passive elements in the array are unterminated.

In order to take advantage of the multiple transmit/receive antenna configurations, rather than cross-correlating a template that is a 1-D vector, a template having a 2-D vector configuration is generated using the outputs of the three transmit/receive antennas.

In one embodiment one therefore utilizes a 2-D template for a gold standard ideal antenna and generates 2-D contingency templates corresponding to all of the imaginable combinations of unterminated elements. In one embodiment 10,000 templates are generated corresponding to the 10,000 contingencies that would result from, for instance, all permutations and combinations of three unterminated elements in, for instance, a ten-element array.

It has been found that the cross-correlation utilizing a 2-D TEST vector that is the result of illuminating the antenna array under test and the 2-D vector contingency templates results in a false alarm-free manufacturing test procedure that can be done with bare antennas as they come off the production line. In this manner, each and every antenna array that comes off the antenna line can be pre-checked prior to encapsulation or deployment in its particular application so that if there is a defective array it can be immediately repaired, knowing which of the passive elements is inoperative.

In one embodiment, the contingency templates utilize the gold standard vector template to normalize all measurements. Moreover, the gold standard vector template is also utilized to analyze the antenna array under test so as to generate a TEST vector to be cross-correlated against all of the contingency vector templates.

It is also noted that, if more than transmit/receive antenna is used, the spacing is such as to be able to intercept the main lobe of the antenna array so that effective measurements can be made of the antenna under test.

In summary, the antenna array under test is compared with a gold standard antenna array that has been purposely altered to unterminate various combinations of its passive elements to establish all possible contingencies for the array. All testing is done in accordance with a gold standard antenna array, with the contingency templates generated by altering the gold standard antenna through unterminating various of the passive elements. A frequency domain reflectometer is used to generate all the reflection coefficients used, with cross-correlation of reflection coefficients with a complete set of contingency templates permitting identifying unterminated passive array elements.

BRIEF DESCRIPTION OF THE DRAWINGS

These and other features of the subject invention will be better understood in connection with the Detailed Description, in conjunction with the Drawings, of which:

FIG. 7 is a series of equations utilized to create a template for the contingency of FIG. 6 in which templates for the three antennas are derived from the measured reflection coefficients for the contingency of FIG. 6, divided by gold standard reflection coefficients for the indicated transmit/receive antenna;

DETAILED DESCRIPTION

Figure 1:
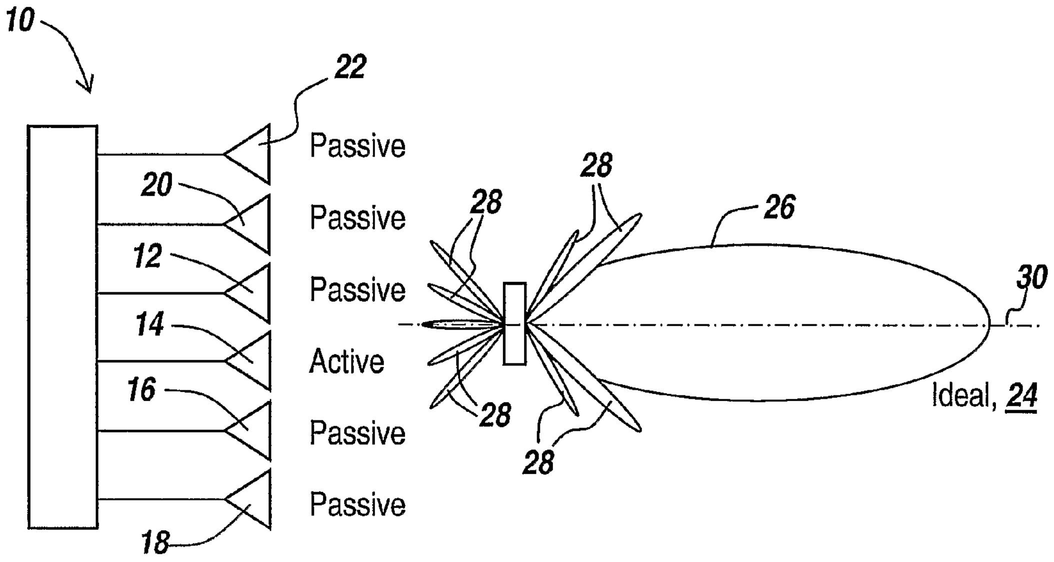
FIG. 1 is a diagrammatic illustration of an antenna array having passive and active elements, which produces an ideal antenna pattern, with the array forming the gold standard for measurement purposes.

Referring now to FIG. 1, in order to test a multi-element antenna array 10 having an active element 12 and passive elements 14, 16, 18, 20 and 22, the ideal antenna array, hereinafter called the gold standard, produces an ideal antenna pattern 24 having a major lobe 26 and various side lobes 28, all symmetrical about the center line 30 of the array.

This ideal antenna pattern permits direction-finding applications in which the direction of incoming signals is determined through the directionality of the antenna array.

Figure 2:
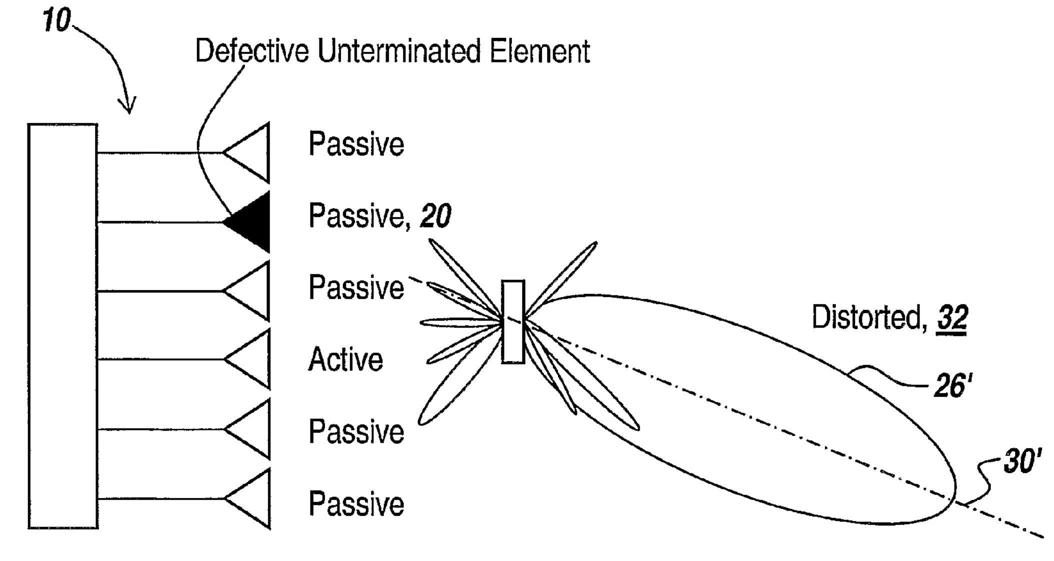
FIG. 2 is a diagrammatic illustration of the distortion of the antenna pattern of FIG. 1 given a defective unterminated element of the antenna array of FIG. 1.

However, as illustrated in FIG. 2, assuming that antenna array 10 has a defective passive element 20 due to the fact, for instance, that the element is unterminated and therefore does not absorb incoming radiation, the entire array will have a distorted antenna pattern, here illustrated at 32, in which at the very least the axis of the major lobe 26', namely axis 30', is considerably altered with respect to the ideal axis as illustrated in FIG. 1.

The effect of an array having defective elements is that direction-finding applications, or indeed any application in which one wants to either direct or receive energy along a predetermined line, is severely hampered.

Oftentimes it is possible in the manufacturing process that when the passive elements are terminated with 50-ohm resistors, either soldering is at fault or other structural problems occur whereby the particular passive element is not provided with a 50-ohm feedpoint impedance.

If the passive elements are not appropriately terminated, then it is impossible to utilize the antenna where antenna pattern performance is critical.

Figure 3:
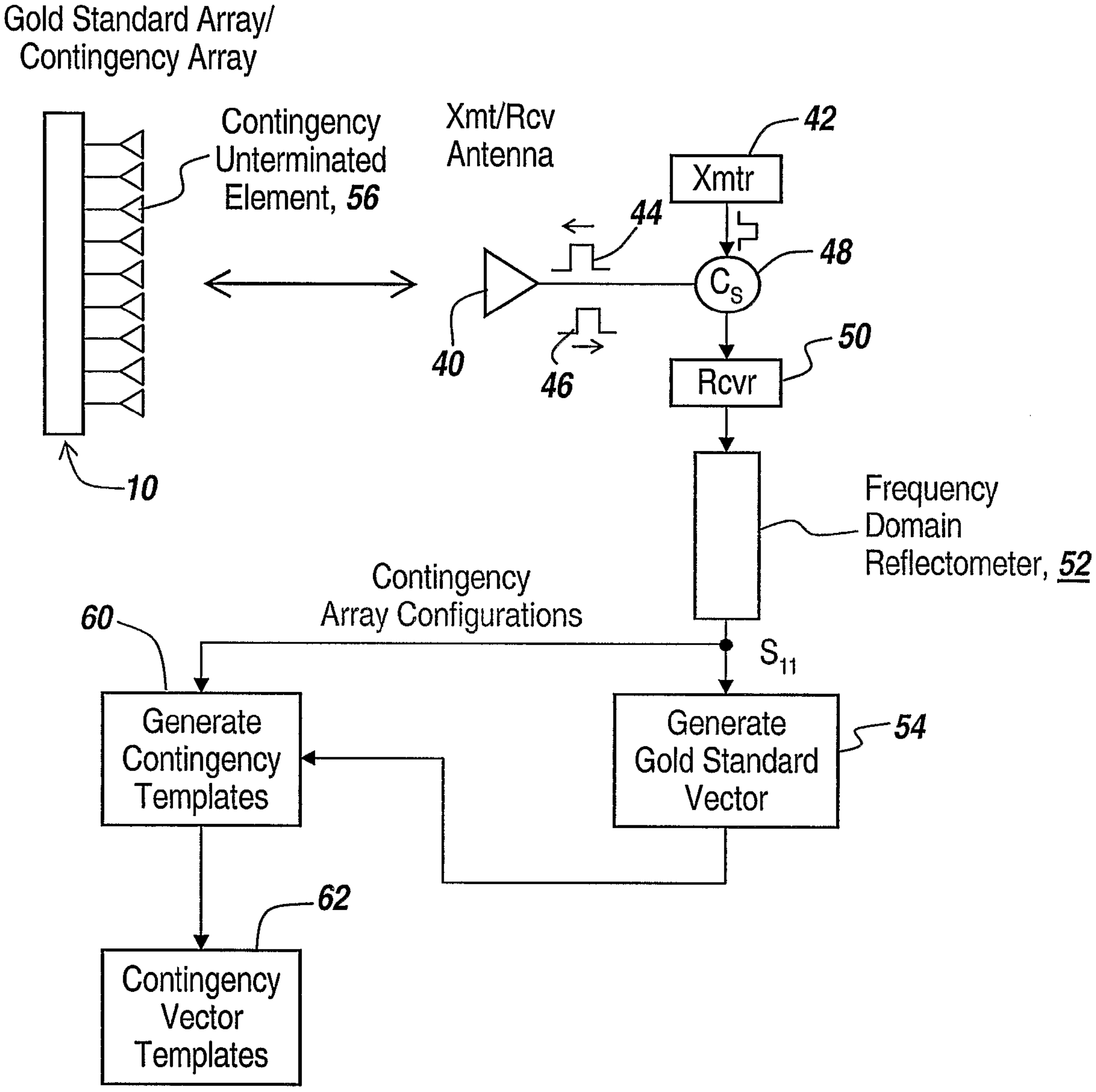
FIG. 3 is a diagrammatic illustration of the utilization of a gold standard and a contingency array in a test environment in which a transmitter transmits pulses from a transmit/receive antenna to the array and in which reflected energy is analyzed by a frequency domain reflectometer that provides reflection coefficients to a gold standard vector generator outputted to a contingency template generator for generating a large number of contingency vector templates corresponding to the contingencies that would be expected with an array having one or more unterminated elements.

How one is able to detect from a bare antenna array that has not been encapsulated or packaged where there are unterminated elements is now described. Referring now to FIG. 3, it is the purpose of the subject invention to irradiate or illuminate a gold standard array or a contingency array 10 with radiation from one or more antennas 40 that are driven by a transmitter 42 with pulses 44 that are projected towards the array. The transmit/receive antenna 40 transmits the outgoing pulses and receives the reflected pulses, here illustrated at 46, and couples them through a circulator 48 to a receiver 50 that is in turn coupled to a frequency domain reflectometer 52. The output of the frequency domain reflectometer is a reflection coefficient, here designated $S_{11}$.

Utilizing a gold standard array and any number of gold standard contingency arrays that are purposely made defective in order to generate contingency array templates, the output of frequency domain reflectometer 52 is coupled to a module 54 that generates a gold standard vector composed of a number of reflection coefficients for the transmit/receive antenna over a band of frequencies ω.

It is important to be able to generate the gold standard vector, be it a 1-D or 2-D vector, which is utilized to normalize the measurements.

As a second step, the gold standard array 10 is purposely altered by unterminating selected passive elements, as illustrated at 56, it being understood that it is necessary to provide for a large number of contingencies. For instance, in an 11-element array that has, for instance, 10 passive elements, if only one element is determined to be unterminated, then there is one position in ten for which a contingency template must be made. If one considers the possibility that there are, in any given array under test, 2 unterminated elements, then this multiplies the numbers of contingency templates that must be generated. Likewise, when considering potentially 3 unterminated elements, the number of contingency templates can be as high as, for instance, 10,000.

It is the purpose of this step to generate contingency templates, as illustrated at 60, by outputting the frequency domain reflectometer reflection coefficients for each of the contingencies. This requires each of the contingency arrays to have a different unterminated element or elements, so as to generate a number of contingency vector templates 62.

Because a frequency domain reflectometer is utilized, the reflection coefficients have both phase and amplitude values, and these phase and amplitude values are contained in the contingency vector template for each of the contingencies, again based on the gold standard or ideal antenna.

It might be thought that one could use a time domain reflectometer in place of a frequency domain reflectometer in order to detect the reflections from the illuminated antenna array and to take only those reflections that come in at a predetermined time period so as to eliminate multi-path and other artifacts. Thus, in effect, one could time gate a time domain reflectometer to eliminate responses of the transmit/receive antenna from other things happening inside the chamber, such as reflections off the chamber walls. Thus, one could utilize time gating to isolate the response of the antenna being radiated, a opposed to artifacts.

While time gating will be discussed hereinafter, for purposes of discussion it will be appreciated that one cannot narrowly define a time gate window to provide an output pulse envelope that is sufficiently narrow to be able to detect what is happening at each of the individual elements of the array. Thus, if one uses a time domain reflectometer, one cannot know which of the elements is bad and which of the elements are good.

The reason is that, in time domain reflectometry, one is only dealing with the amplitude of the return pulse, whereas in frequency domain reflectometry, one deals with both phase and amplitude. It is the detection of both phase and amplitude that permits the isolation of the unterminated element.

When utilizing time domain reflectometry, one is not able to detect the missing element by simply looking at the shape of the pulse that comes back to the transmit/receive antenna. In other words, time domain reflectometry is an extremely insensitive procedure.

However, by transforming the time domain data in to frequency domain data expressed in phase and amplitude versus frequency, one can obtain the requisite information.

Thus, as is well known for frequency domain reflectometers, one has a complex reflection coefficient relating to phase and amplitude versus frequency, which is inherent in the returned pulse. While most would not look at the phase of the pulse, in the subject invention both phase and amplitude are detected in order to be able to determine unterminated or malfunctioning elements. Note that the symbol $S_{11}$ refers to the complex reflection coefficient.

Figure 4:
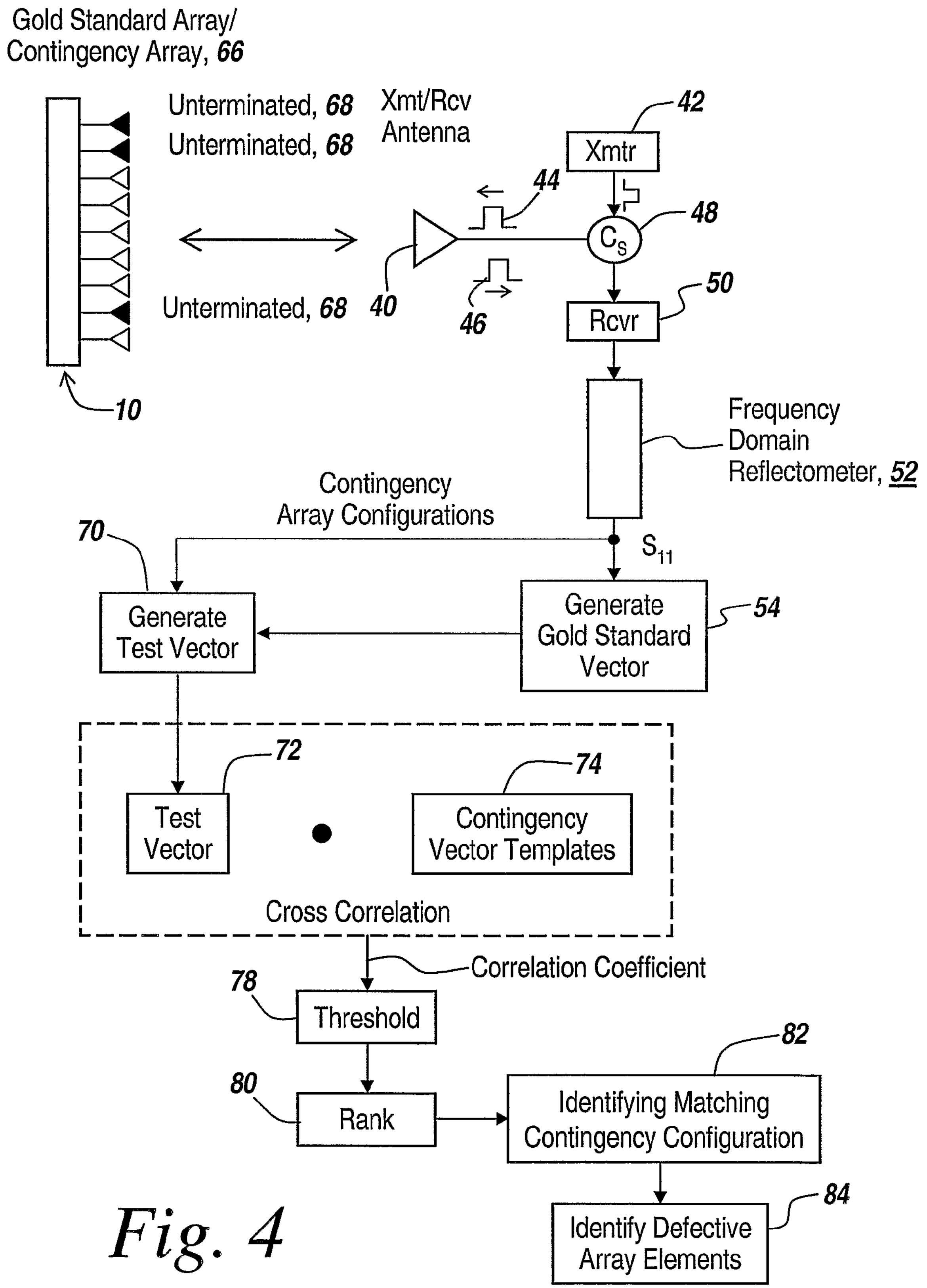
FIG. 4 is a diagrammatic illustration of the testing of an antenna array having unterminated elements in which returns from the antenna array under test are processed by the frequency domain reflectometer of FIG. 3 so as to generate a TEST vector for the antenna under test, which TEST vector is cross-correlated with contingency vector templates to ascertain via correlation coefficient and thresholding the identity of the matching contingency and therefore the identity of the defective array element or elements.

Having derived a large library of contingency templates in the manner described in FIG. 3, and referring now to FIG. 4, an antenna array under test 66 may, for instance, have a number of unterminated elements, here illustrated at 68.

When transmitter 42 illuminates the antenna array under test with pulse 44 and receives reflected pulses 46, these pulses are detected by receiver 50 and are coupled to frequency domain reflectometer 52 as described above.

The complex reflection coefficients from the frequency domain reflectometer are both coupled to the module 54, which generates the gold standard vector, and are also applied to a module 70 that generates an antenna-under-test vector. The antenna-under-test vector is normalized utilizing the output from module 54 so as to provide a normalized test vector 72 that is dot-multiplied with all of the contingency vector templates, here illustrated at 74.

The cross-correlation is illustrated in dotted box 76, with the correlation coefficients being thresholded at 78 and/or provided to a module that ranks the correlation coefficients, here illustrated at 80. In any event, whether by thresholding or by ranking and choosing the contingency that is most highly correlated, one identifies the matching contingency and therefore the corresponding configuration of the antenna, as illustrated at 82. This subsequently results in the identification of the defective array element, as illustrated at 84. The identification occurs by merely noting which of the contingency configurations has the highest cross-correlation coefficient and noting for the contingency which of the antenna array elements of the antenna array under test have unterminated outputs or apertures.

Figure 5:
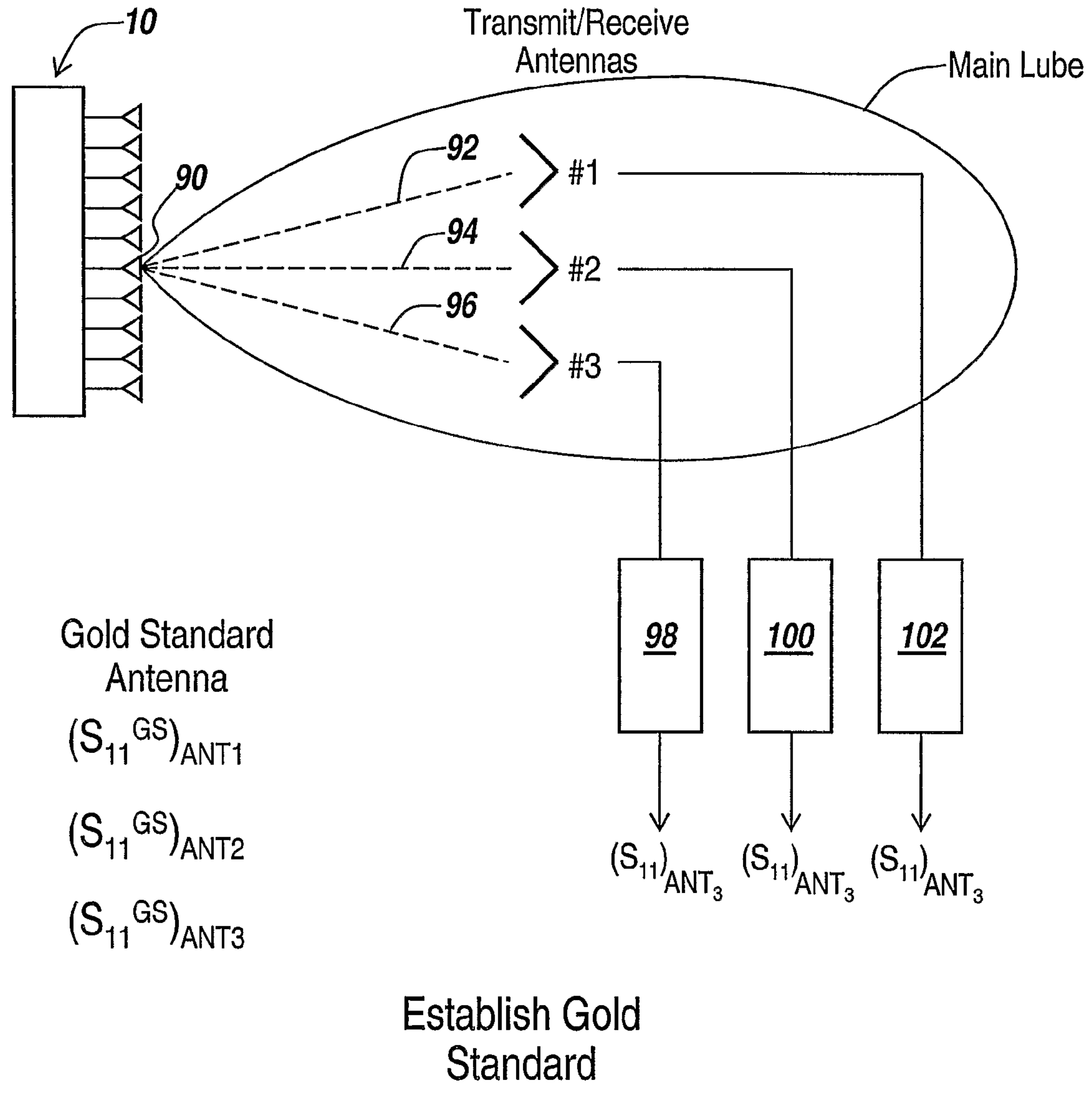
FIG. 5 is a diagrammatic illustration of the utilization of multiple transmit and receive antennas and the generation of reflection coefficients for outputs from the three antennas.

Referring to FIG. 5 and as mentioned hereinbefore, one can use a number of transmit/receive antennas, here illustrated by Antenna #1, Antenna #2 and Antenna #3, each of which illuminate an element 90 on array 10 from three different directions, namely 92, 94 and 96.

The outputs of these antennas when operating in the receive mode are coupled to respective frequency domain reflectometers 98, 100 and 102 that again respectively output complex reflection coefficients $(S_{11})_{ANT1}$, $(S_{11})_{ANT2}$ and $(S_{11})_{ANT3}$. The purpose of using multiple antennas is to provide more information such that the measurements are, for instance, three times the size of those from a single antenna. It is noted also that the use of multiple antennas significantly decreases the false alarm rate if one is looking for unterminated antenna elements because the larger the template that can be generated, whether it be for the gold standard, the contingency templates, or the antenna-under-test vector, the less the false alarm rate will be due the higher probability of detection.

As can be seen from FIG. 5, one first develops gold standard antenna complex reflection coefficients from the outputs of each of the transmit/receive antennas. Thus, in order to establish the gold standard mentioned above, the results for each of the transmit/receive antennas in terms of reflection coefficients are stored.

Figure 6:
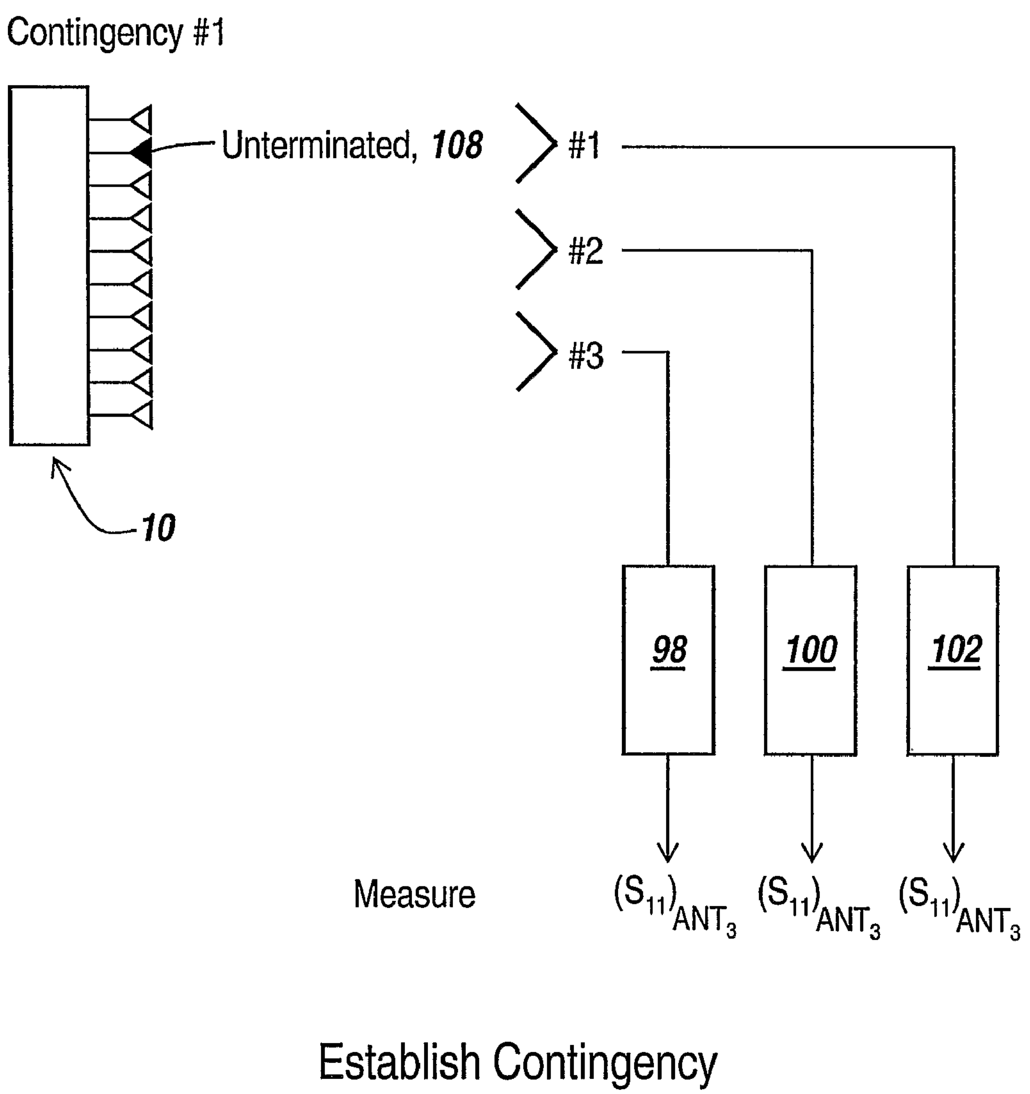
FIG. 6 is a diagrammatic illustration of a contingency in which one of the elements of the array is unterminated so as to generate a series of reflection coefficients corresponding to the receipt of reflected signals at the transmit/receive antennas.

Referring now to FIG. 6, the gold standard antenna must be reconfigured for each of the possible unterminated antenna element contingencies that might happen. Here, a Contingency 1 is illustrated in which the gold standard array has one of its elements unterminated, as illustrated at 108. This results in a Contingency 1 gold standard antenna array, the measured complex reflection coefficients thereof for each of the transmit/receive antennas being $(S_{11}^{C1})_{ANT1}$, $(S_{11}^{C1})_{ANT2}$, and $(S_{11}^{C1})_{ANT3}$.

This establishes the gold standard antenna response in which one has a predetermined contingency in which one of the passive antenna elements of the array is purposely unterminated.

Referring now to FIG. 7, one needs to be able to create a template with the measured values of FIG. 6.

Here it can be seen that one gets a template $T_{ANT1}(\omega)$, $T_{ANT2}(\omega)$ and $T_{ANT3}(\omega)$ in which each of the measured contingency reflection coefficient responses is divided by the gold standard response for which no contingencies exist.

Figure 8:
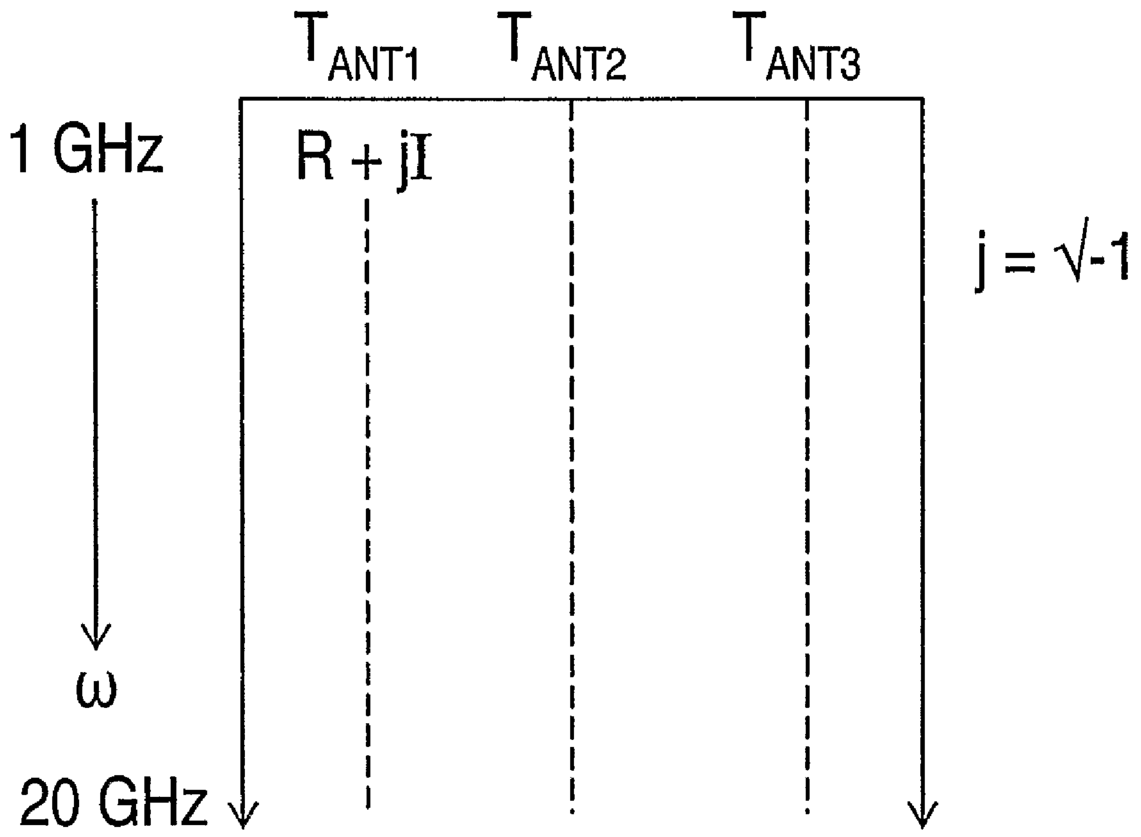
FIG. 8 is a diagrammatic illustration of the creation of a 2-D vector template utilizing the templates associated with each of the transmit/receive antennas to create a number N of $T_{2-D}^{C_N}$ templates that characterize every contingency for the array.

The result is that one has a number of templates. However, because one is utilizing three transmit/receive antennas and referring now to FIG. 8, one makes or creates a 2-D contingency vector template in which the complex reflection coefficients for each of the antennas are placed in a table relative to their frequency. Here it is shown that the frequency goes from 1 GHz to 20 GHz, with each of the entries being a complex value as would be expected from a frequency domain reflectometer complex reflection coefficient output. In this manner and providing a large number of contingencies, one can create $NT_{2\text{-}D}^{C_N}$ templates to characterize every contingency that could occur in the particular antenna array.

Figure 9:
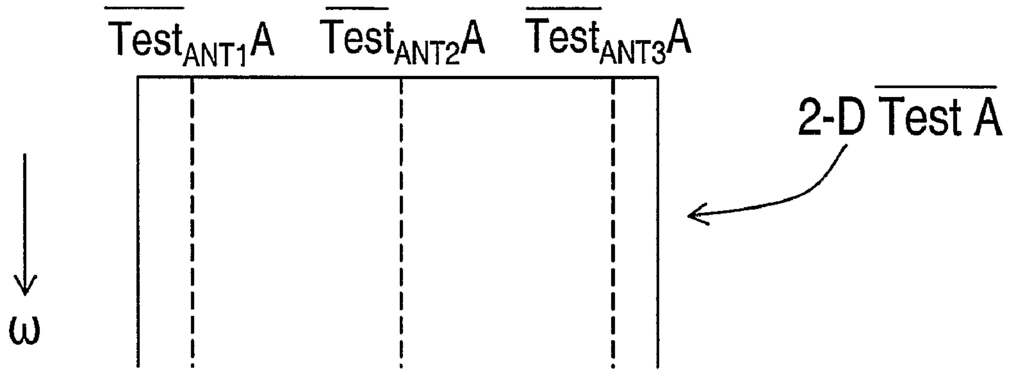
FIG. 9 is a diagrammatic illustration of the process of testing an antenna to create a 2-D TEST vector for the antenna array under test by measuring the reflection coefficients for the antenna array under test at each of the transmit/receive antennas, developing a test vector for each of the measured readings normalized to the gold standard reflection coefficients and the utilization of the test vectors for each of the transmit/receive antennas in a 2-D TEST A vector to fully characterize the characteristics of the antenna under test.

Referring now to FIG. 9, for an antenna under test, one must create a 2-D vector, here designated as TEST. In order to test the antenna array, one measures for each of the transmit/receive antennas the complex reflection coefficient for the test antenna array, with the antenna array under test designated A.

One then generates a number of test vectors, namely TEST $A_{ANT1}$, TEST $A_{ANT2}$ and TEST $A_{ANT3}$. Again, these measurements are normalized to the gold standard reflection coefficients for each of the transmit/receive antennas.

The TEST $A_{ANT1}$, TEST $A_{ANT2}$ and TEST $A_{ANT3}$ reflection coefficients are then used to develop a 2-D TEST A vector so as to fully characterize the antenna array under test.

Figures 10, 11:
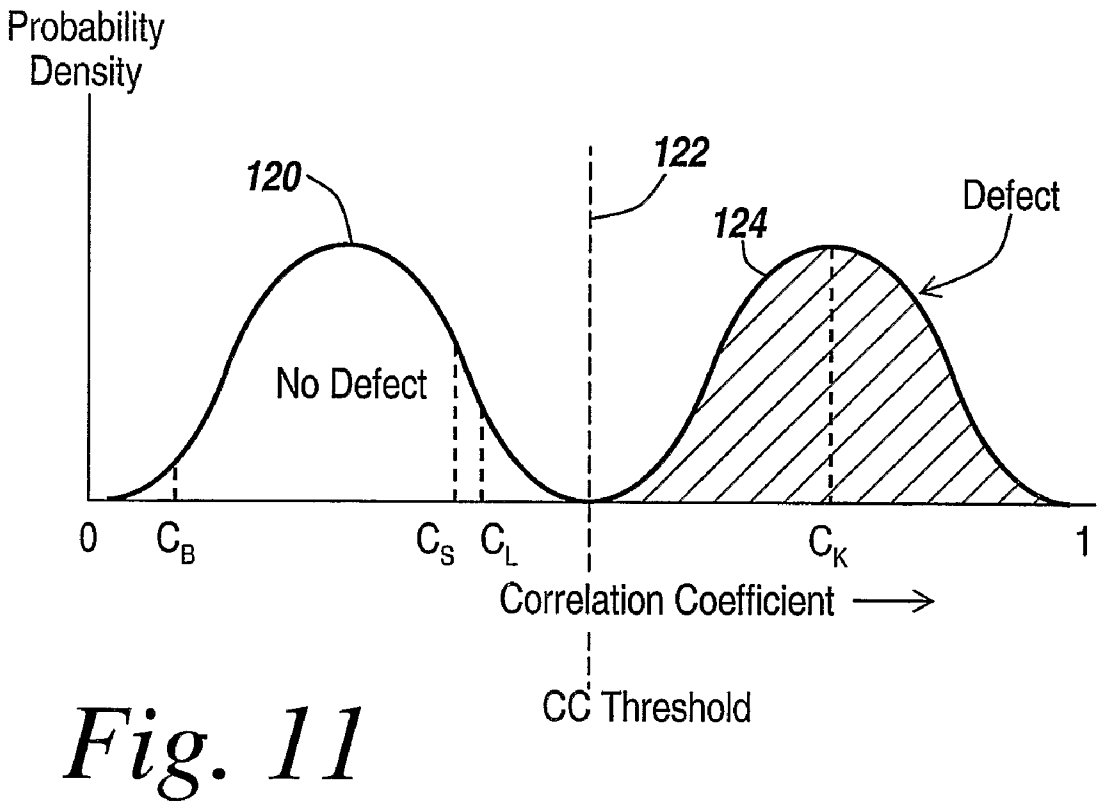
FIG. 10 is a diagrammatic illustration of the calculation of the correlation coefficient for all contingencies based on the 2-D templates for all of the contingencies, which are dot-multiplied by the 2-D Test A vector divided by the absolute magnitude of the 2-D contingency templates multiplied by the absolute magnitude of the 2-D TEST A vector.
FIG. 11 is a graph showing probability density versus probability, showing two populations that are the result of the correlation of FIG. 10, illustrating an area for which there are no defects, a correlation coefficient threshold and a population showing a defect as determined by correlation between the reflection coefficients of the antenna array dot-multiplied by the contingency templates to indicate that one contingency template is highly correlated.

In order to evaluate the antenna array under test and as illustrated in FIG. 10, one calculates the correlation coefficient for all of the N contingencies such that the correlation coefficient is the dot-product of all of the contingency templates in 2-D form, dot-multiplied by the complex conjugate of the 2-D TEST vector for the antenna array under test, all divided by the multiplication of the absolute magnitude of the N 2-D templates multiplied by the absolute magnitude of the 2-D TEST A vector.

The result, as can be seen in FIG. 11 is a graph of probability density versus probability that has two populations, illustrated by curve 120. Here it can be seen that the first population, which lies to the left of a probability threshold 122, indicates that for all of the contingencies there is no high correlation, therefore no defect.

On the other hand, for a particular contingency, here illustrated by $C_K$, there is a high correlation, as illustrated at 124. Thus, for correlations above a given cross-correlation coefficient, one can ascertain that the associated contingency is present and knowing what the associated contingency is, determine the passive element involved.

One can adjust the correlation threshold to the left and right to increase detectability or, on the other hand, increase false alarm protection.

Figure 12:
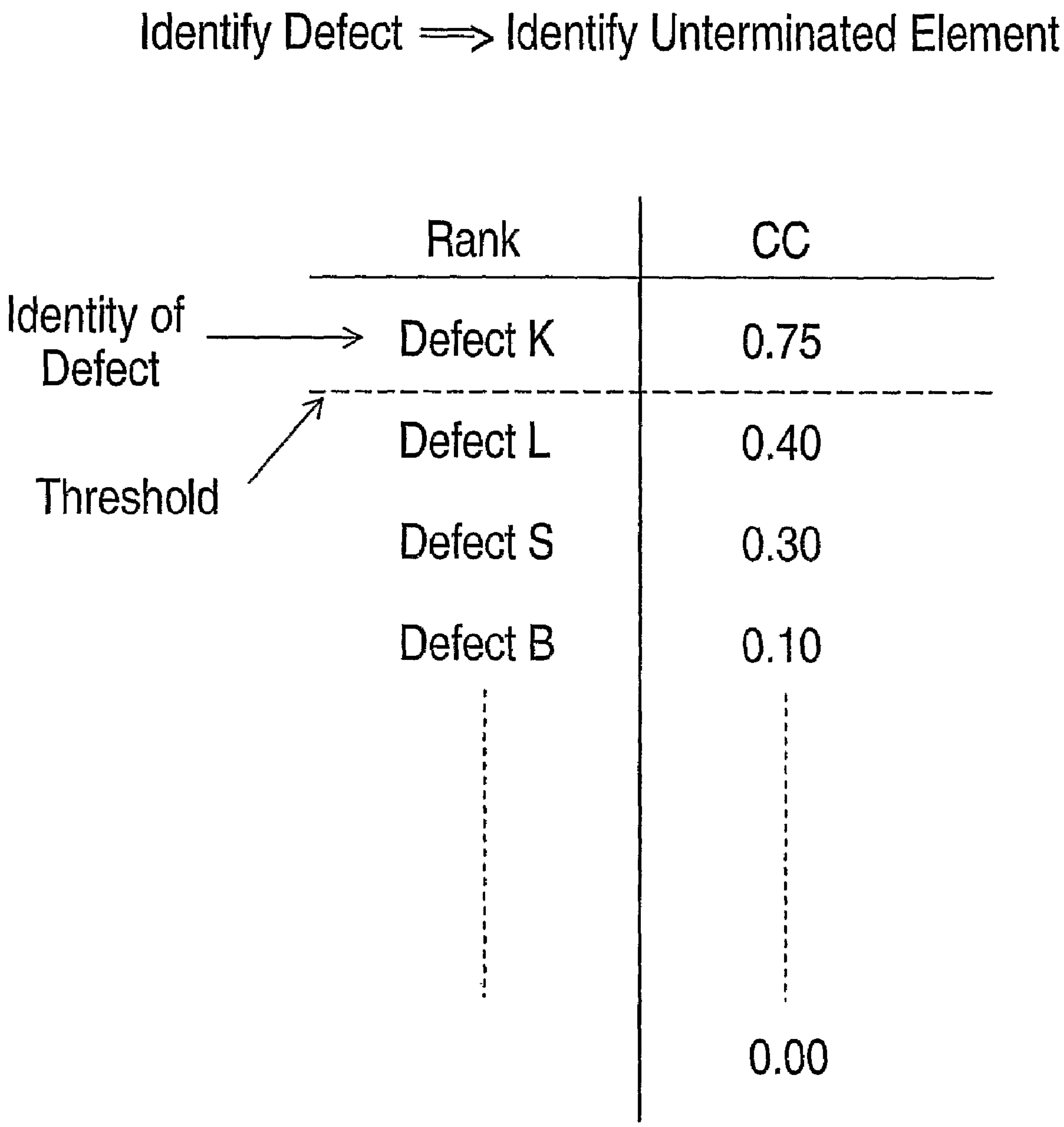
FIG. 12 is a chart illustrating the ranking of the various defects corresponding to the contingency templates, illustrating the rank of cross-correlations for all of the contingency templates, whereby through analysis of the rank and the distance of the defect from the next adjacent rank, one can ascertain the unterminated element or elements corresponding to the K contingency; and, FIG. 13 is a diagrammatic illustration of the sequencing of pulses from a transmitter through various transmit/receive antennas, also indicating time gating to eliminate from frequency domain reflectometer measurements artifacts or multi-path returns that exist at the apertures of the transmit/receive antennas.

Alternatively, as illustrated in FIG. 12, one can take the correlation result and rank the particular contingencies in terms of their corresponding defects such that, for instance, as illustrated in the Rank Table, defect K corresponding to contingency K has a 0.75 correlation coefficient, whereas defects L, S and B have respectively much lower correlation coefficients. The ranking system may be used because one can immediately compare by rank all of the contingencies and ascertain if there is one contingency that has a correlation coefficient that is much larger than any of the rest. This in turn permits another means of identifying the contingency that has the high correlation and thus the defect and the corresponding unterminated element or elements.

Figure 13:
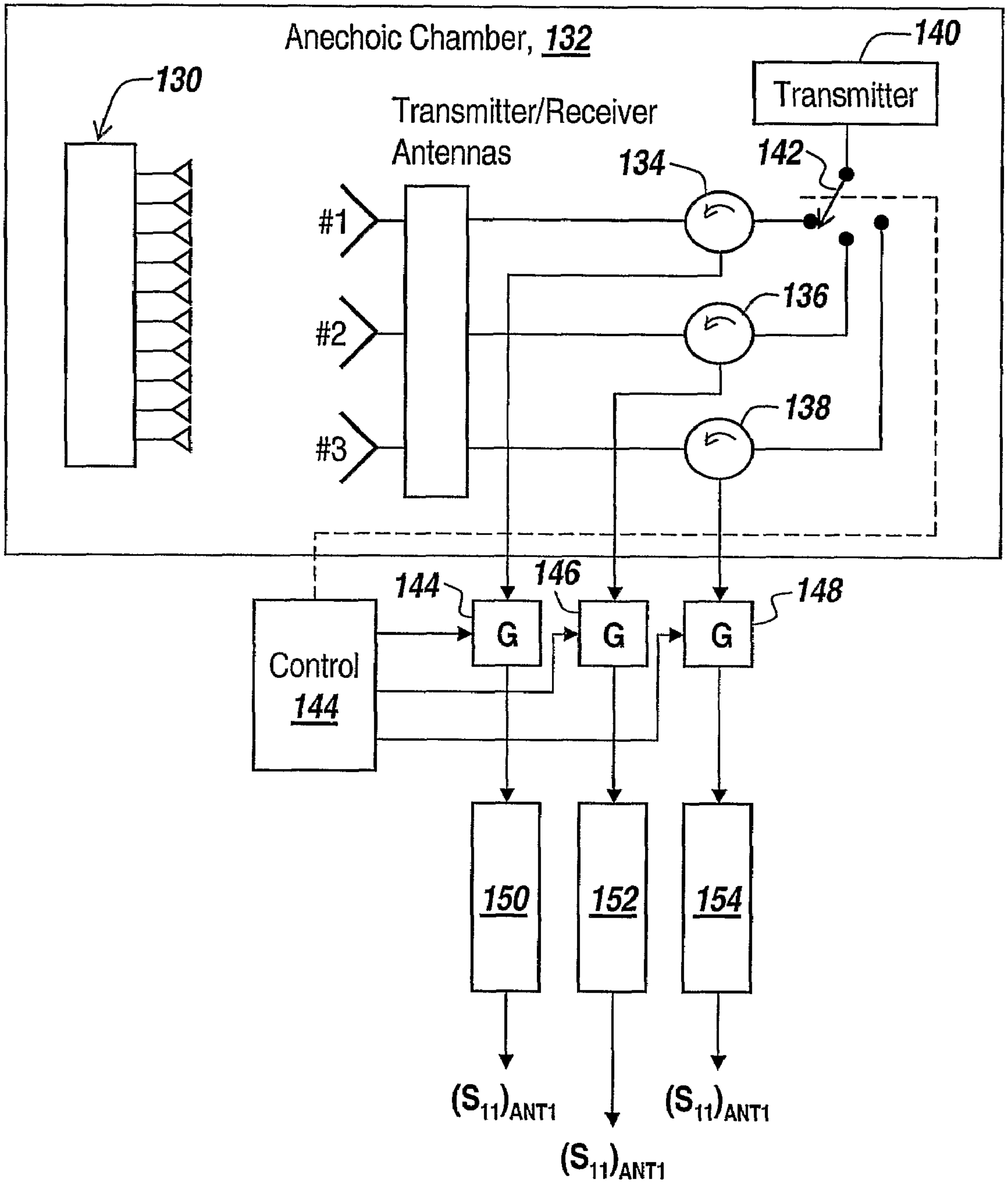

Referring now to FIG. 13, it will be appreciated that an antenna array 130 is usually placed in an anechoic chamber 132 and is spaced from the transmit/receive antennas Numbers 1, 2 and 3, which are in turn coupled to circulators 134, 136 and 138 respectively. Transmitter 140 produces pulses that are sequentially coupled to the transmit/receive antennas via a single-pole, multiple-throw switch 142 that is under the control of a control unit 144. It is thus possible to know when pulses are emitted from the various transmit/receive antennas and to be able to time gate by time gates 144, 146 and 148, the outputs of the antennas, such that the outputs of frequency domain reflectometers 150, 152 and 154 will not be corrupted by reflections from the anechoic chambers or artifacts within the chamber so as to corrupt the reflection coefficients from the antennas.

What is therefore provided is a method for locally testing bare antennas as they come off the production line to ascertain if any of the passive elements are unterminated and to be able to correct the defective elements by properly terminating them prior to their being encapsulated or deployed in their particular application. This saves considerable amount of time and considerable expense so that the individual bare antennas need not be transported to a large antenna range for testing. The result is enhanced quality control for antenna arrays produced on a production line and minimizes expense.

The subject system solves the problem of ascertaining not only that the antenna pattern for a particular array under test is defective, but also to ascertain what passive elements in the array are causing the problem.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for testing an assembled antenna array, comprising the steps of:

locating the antenna array to be tested in spaced adjacency to a transmit/receive antenna aimed at the antenna array;

using the transmit/receive antenna to project RF energy towards the antenna array and to intercept returns from the array;

performing a frequency domain reflectometer measurement of the energy returned to the transmit/receive antenna so as to produce complex reflection coefficients;

correlating the complex reflection coefficients with a large number of contingency templates;

ascertaining which of the contingency templates most nearly matches the reflection coefficients that are the result of testing the antenna array; and, identifying from the ascertained contingency template an array element that is improperly terminated, whereby bare antenna arrays that have been manufactured can be quickly tested for passive elements being improperly terminated that distort the antenna pattern of the manufactured antenna array.

2. The method of claim 1, and further including the step of forming a contingency template from returns from a gold standard antenna array having at least one of its passive elements improperly terminated, such that the corresponding template when matched indicates the existence of a defective improperly terminated passive element at the same position as that of the improperly terminated element in the gold standard antenna array.

3. The method of claim 2, wherein the contingency template is in the form of a vector and wherein the contingency template vector is normalized to a gold standard vector.

4. The method of claim 3, wherein the identifying step includes the step of cross-correlating a vector that is the result of complex reflection coefficients from an antenna array under test with all of the contingency vectors, thus to generate a correlation coefficient.

5. The method of claim 4, wherein the correlation coefficient is the dot-product of a contingency vector with the complex conjugate of the reflection coefficient vector for the antenna array under test and further including the step of dividing the dot-product of the absolute magnitude of a contingency vector times the absolute magnitude of the complex conjugate of the reflection coefficient vector for the antenna array under test.

6. The method of claim 1, and further including the use of multiple transmit/receive antennas aimed at the antenna array under test.

7. The method of claim 6, and further including the step of providing RF pulses in sequence to the multiple transmit/receive antennas and providing a complex reflection coefficient for the energy returned to each of the multiplicity of transmit/receive antennas, the complex reflection coefficients from the multiplicity of transmit/receive antennas providing increased information about the operation of the antenna array under test.

8. The method of claim 7, and further including the step of providing a 2-D vector populated with complex reflection coefficients derived from each of the multiplicity of transmit/receive antennas.

9. The method of claim 8, and further including the step of time gating the outputs of the multiplicity of transmit/receive antennas to eliminate the effects of unwanted reflections.

10. The method of claim 8, and further mounting the antenna array under test and the transmit/receive antennas in an anechoic chamber to reduce the effects of reflections of energy returned from the antenna array under test to the transmit/receive antennas.

11. The method of claim 4, wherein the identifying step includes thresholding the correlation coefficients so as to reject coefficients below a predetermined threshold, whereby the correlation coefficients above the predetermined threshold reliably indicate a contingency and thus a passive element that is improperly terminated.

12. The method of claim 8, wherein the inter-antenna spacing between the multiple transmit/receive antennas and the spacing between the multiple transmit/receive antennas and the antenna array under test is such that all of the multiple transmit/receive antennas are within the major lobe of the antenna array under test.

13. The method of claim 1, wherein the complex correlation coefficients derived from the transmit/receive antenna are used to populate a 1-D vector.

14. The method of claim 13, wherein the 1-D vector is used to characterize the gold standard antenna array.

15. The method of claim 13, wherein the 1-D vector is used to characterize the gold standard antenna array that has been purposely altered to have at least one of its passive antenna elements improperly terminated.

16. The method of claim 1, and further including a multiplicity of transmit/receive antennas utilized to project energy towards the antenna array under test and to receive reflections therefrom, and wherein the complex correlation coefficients for the multiplicity of antennas are used to populate a 2-D vector.

17. The method of claim 16, wherein the 2-D vector is used to characterize the gold standard antenna array.

18. The method of claim 16, wherein the 2-D vector is used to characterize the gold standard antenna array that has been purposely altered to have at least one of its passive antenna elements improperly terminated.

19. A method of testing an antenna array having at least one active element and at least one passive element, comprising the steps of:

measuring the reflected energy from the passive element; and, determining from the reflected energy from the passive element if the passive element is properly terminated.

20. The method of claim 19, wherein the determination step includes the steps of generating a complex reflection coefficient from radiation returns from the antenna array under test and cross-correlating the complex reflection coefficient with a set of complex reflection coefficients generated from a known antenna array having at least one known unterminated passive element to generate a correlation coefficient, whereby a correlation coefficient above a predetermined threshold indicates which of the passive elements in the antenna array under test has a faulty termination.

* * * * *